United States Patent
Twitchell, Jr.

(10) Patent No.: US 8,955,110 B1
(45) Date of Patent: Feb. 10, 2015

(54) IP JAMMING SYSTEMS UTILIZING VIRTUAL DISPERSIVE NETWORKING

(76) Inventor: Robert W. Twitchell, Jr., Cumming, GA (US)

( * ) Notice: Subject to any disclaimer, the term of this patent is extended or adjusted under 35 U.S.C. 154(b) by 880 days.

(21) Appl. No.: 13/007,588

(22) Filed: Jan. 14, 2011

(51) Int. Cl.
*H04L 29/06* (2006.01)
(52) U.S. Cl.
CPC ........ *H04L 63/1408* (2013.01); *H04L 63/1433* (2013.01)
USPC .............................................. 726/22; 726/25
(58) Field of Classification Search
None
See application file for complete search history.

(56) References Cited

U.S. PATENT DOCUMENTS

| | | | |
|---|---|---|---|
| 5,274,762 A | 12/1993 | Peterson et al. | |
| 5,537,417 A | 7/1996 | Sharma et al. | |

(Continued)

FOREIGN PATENT DOCUMENTS

| | | | |
|---|---|---|---|
| EP | 1089506 A2 | 4/2001 | |
| EP | 1791300 A1 | 9/2007 | |

(Continued)

OTHER PUBLICATIONS

Information Disclosure Statement (IDS) Letter Regarding Common Patent Application(s), dated Sep. 30, 2011.

(Continued)

*Primary Examiner* — Benjamin Lanier
(74) *Attorney, Agent, or Firm* — Tillman Wright, PLLC; Chad D. Tillman; Jeremy C. Doerre

(57) ABSTRACT

An unmanned aerial system includes: a plurality of unmanned aerial vehicles, each unmanned aerial vehicle comprising, or having secured thereto, electronic components having software loaded thereon configured to spawn a virtual machine that virtualizes network capabilities of the electronic components; and an electronic device having software loaded thereon configured to spawn a virtual machine that virtualizes network capabilities of the respective electronic device. Each of the plurality of unmanned aerial vehicles is configured for air-to-air electronic communications over a connection with other of the unmanned aerial vehicles, the connection being associated with a virtual machine spawned at the electronic components associated with that respective unmanned aerial vehicle that virtualizes network capabilities of the electronic components. Each of the plurality of unmanned aerial vehicles is configured for air-to-ground communications over a connection with the electronic device, the connection being associated with a virtual machine spawned at the electronic components associated with that respective unmanned aerial vehicle that virtualizes network capabilities of the electronic components. A method for IP jamming utilizing a plurality of electronic devices each having software loaded thereon configured to spawn a virtual machine that virtualizes network capabilities of that respective electronic device, the method includes: communicating from a first electronic device, utilizing virtual dispersive routing, networking information for a network attack to a plurality of other electronic devices; commencing, by the plurality of other electronic devices, a network attack using received networking information; communicating, to each of the plurality of other electronic devices, instructions to modify the network attack; and adapting, in response to received instructions to modify the network attack, by one or more of the plurality of other electronic devices, operations forming part of the commenced network attack.

20 Claims, 10 Drawing Sheets

(56) References Cited

U.S. PATENT DOCUMENTS

| | | |
|---|---|---|
| 5,598,532 A | 1/1997 | Liron |
| 5,761,195 A | 6/1998 | Lu |
| 6,011,792 A | 1/2000 | Miloslavsky |
| 6,061,349 A | 5/2000 | Coile et al. |
| 6,104,801 A | 8/2000 | Miloslavsky |
| 6,683,885 B1 | 1/2004 | Sugai et al. |
| 6,704,803 B2 | 3/2004 | Wilson et al. |
| 6,742,023 B1 | 5/2004 | Fanning et al. |
| 6,922,774 B2 | 7/2005 | Meushaw et al. |
| 7,254,114 B1 | 8/2007 | Turner et al. |
| 7,270,193 B2 | 9/2007 | Hashimoto et al. |
| 7,281,247 B2 | 10/2007 | Lodwick et al. |
| 7,319,700 B1 | 1/2008 | Kompella |
| 7,350,071 B1 | 3/2008 | Reisman |
| 7,383,327 B1 | 6/2008 | Tormasov et al. |
| 7,441,113 B2 | 10/2008 | Chong et al. |
| 7,441,270 B1 | 10/2008 | Edwards et al. |
| 7,483,978 B2 | 1/2009 | Esfahany et al. |
| 7,584,285 B2 | 9/2009 | Hudson et al. |
| 7,620,955 B1 | 11/2009 | Nelson |
| 7,630,368 B2 | 12/2009 | Tripathi et al. |
| 7,693,064 B2 | 4/2010 | Thubert et al. |
| 7,720,672 B1 | 5/2010 | Buswell et al. |
| 7,756,027 B1 | 7/2010 | Reddy et al. |
| 7,757,293 B2 | 7/2010 | Caceres et al. |
| 7,765,307 B1 | 7/2010 | Kritov et al. |
| 7,788,713 B2 | 8/2010 | Grobman et al. |
| 7,895,348 B2 | 2/2011 | Twitchell |
| 8,341,291 B2 | 12/2012 | Twitchell, Jr. |
| 8,341,292 B2 | 12/2012 | Twitchell, Jr. |
| 8,352,636 B2 | 1/2013 | Twitchell, Jr. |
| 8,423,664 B2 | 4/2013 | Twitchell |
| 8,429,226 B2 | 4/2013 | Twitchell |
| 8,429,293 B2 | 4/2013 | Twitchell |
| 8,433,818 B2 | 4/2013 | Twitchell |
| 8,433,819 B2 | 4/2013 | Twitchell, Jr. |
| 8,443,440 B2 | 5/2013 | McGee |
| 8,447,882 B2 | 5/2013 | Twitchell, Jr. |
| 2002/0019831 A1 | 2/2002 | Wade |
| 2002/0072939 A1 | 6/2002 | Kawaberi |
| 2002/0107890 A1 | 8/2002 | Gao et al. |
| 2002/0119821 A1 | 8/2002 | Sen et al. |
| 2002/0132209 A1 | 9/2002 | Grant et al. |
| 2002/0136209 A1 | 9/2002 | Shtivelman |
| 2003/0008712 A1 | 1/2003 | Poulin |
| 2003/0069957 A1 | 4/2003 | Malmskog et al. |
| 2003/0088610 A1 | 5/2003 | Kohn et al. |
| 2003/0110288 A1 | 6/2003 | Ramanujan et al. |
| 2003/0123419 A1 | 7/2003 | Rangnekar et al. |
| 2003/0137974 A1 | 7/2003 | Kwan et al. |
| 2003/0202008 A1 | 10/2003 | McDonald et al. |
| 2004/0054650 A1 | 3/2004 | Chun |
| 2004/0076277 A1 | 4/2004 | Kuusinen et al. |
| 2004/0128670 A1 | 7/2004 | Robinson et al. |
| 2004/0205777 A1 | 10/2004 | Zalenski et al. |
| 2004/0230660 A1 | 11/2004 | Abjanic et al. |
| 2004/0240440 A1 | 12/2004 | Wild, III et al. |
| 2004/0252661 A1 | 12/2004 | Lintulampi et al. |
| 2004/0252674 A1 | 12/2004 | Soininen et al. |
| 2004/0255161 A1 | 12/2004 | Cavanaugh |
| 2005/0004968 A1 | 1/2005 | Mononen et al. |
| 2005/0015511 A1 | 1/2005 | Izmailov et al. |
| 2005/0100002 A1 | 5/2005 | Oouchi et al. |
| 2005/0132362 A1 | 6/2005 | Knauerhase et al. |
| 2005/0222858 A1 | 10/2005 | Okada |
| 2006/0029064 A1 | 2/2006 | Rao et al. |
| 2006/0050719 A1 | 3/2006 | Barr et al. |
| 2006/0085855 A1 | 4/2006 | Shin et al. |
| 2006/0182108 A1 | 8/2006 | Krumel |
| 2006/0224920 A1 | 10/2006 | Rooholamini et al. |
| 2006/0253532 A1 | 11/2006 | Kukoleca |
| 2007/0060363 A1 | 3/2007 | Nguyen et al. |
| 2007/0078988 A1 | 4/2007 | Miloushev et al. |
| 2007/0110048 A1 | 5/2007 | Voit et al. |
| 2007/0179955 A1 | 8/2007 | Croft et al. |
| 2007/0192862 A1 | 8/2007 | Vermeulen et al. |
| 2007/0198656 A1 | 8/2007 | Mazzaferri et al. |
| 2008/0002663 A1 | 1/2008 | Tripathi et al. |
| 2008/0008202 A1 | 1/2008 | Terrell et al. |
| 2008/0075084 A1 | 3/2008 | Choi et al. |
| 2008/0090628 A1 | 4/2008 | Mueller et al. |
| 2008/0271015 A1 | 10/2008 | Ibrahim |
| 2009/0077254 A1 | 3/2009 | Darcie et al. |
| 2009/0100128 A1 | 4/2009 | Czechowski et al. |
| 2009/0106439 A1 | 4/2009 | Twitchell |
| 2009/0204964 A1 | 8/2009 | Foley et al. |
| 2009/0320137 A1* | 12/2009 | White et al. ............ 726/25 |
| 2009/0327392 A1 | 12/2009 | Tripathi et al. |
| 2010/0009758 A1 | 1/2010 | Twitchell |
| 2011/0179136 A1 | 7/2011 | Twitchell |
| 2012/0014389 A1 | 1/2012 | Twitchell |
| 2012/0016955 A1 | 1/2012 | Twitchell, Jr. |
| 2012/0016956 A1 | 1/2012 | Twitchell |
| 2012/0016984 A1 | 1/2012 | Twitchell, Jr. |
| 2012/0017005 A1 | 1/2012 | Twitchell, Jr. |
| 2012/0017006 A1 | 1/2012 | Twitchell |
| 2012/0017008 A1 | 1/2012 | Twitchell, Jr. |
| 2012/0017212 A1 | 1/2012 | Twitchell |
| 2012/0017265 A1 | 1/2012 | Twitchell, Jr. |
| 2012/0020352 A1 | 1/2012 | Twitchell |
| 2012/0020353 A1 | 1/2012 | Twitchell |
| 2012/0023202 A1 | 1/2012 | Twitchell, Jr. |
| 2012/0023244 A1 | 1/2012 | Twitchell, Jr. |
| 2012/0023258 A1 | 1/2012 | Twitchell |
| 2012/0026889 A1 | 2/2012 | Twitchell, Jr. |
| 2012/0030362 A1 | 2/2012 | Twitchell, Jr. |
| 2012/0166653 A1 | 6/2012 | Twitchell |
| 2012/0272315 A1 | 10/2012 | Twitchell |
| 2013/0117823 A1 | 5/2013 | Dang et al. |

FOREIGN PATENT DOCUMENTS

| | | |
|---|---|---|
| WO | 2006058544 A1 | 6/2006 |
| WO | 2009052452 | 4/2009 |

OTHER PUBLICATIONS

"International Search Report" and "Written Opinion of the International Search Authority" (Korean Intellectual Property Office) in Dispersive Networks Inc. et al, International Patent Application Serial No. PCT/US2008/080397, dated May 21, 2009, 12 pages.

Maier, S.; Grau, A.; Weinschrott, H.; Rothermel, K.; "Scalable Network Emulation: A Comparison of Virtual Routing and Virtual Machines," Computers and Communications, 2007. ISCC 2007. 12th IEEE Symposium on, vol., no., pp. 395-402, Jul. 1-4, 2007/.

Agrawal, A.; Ganguly, A.; Boykin, P.O.; Figueiredo, R.J.;, "Towards P2P-routed IF overlay networks for grid virtual machines," High Performance Distributed Computing, 2005. HPDC-14. Proceedings. 14th IEEE International Symposium on, vol., no., pp. 293-294, Jul. 24-27, 2005.

"Virtual Routing: Bringing TCP/IP to a New Level." Interpeak AB. 2005. pp. 1-8. <http://www.interpeak.com/files/vr_white.pdf>.

Dacey, Andrew. "How ARP Works". Archived by the Internet Archive on Apr. 3, 2005: <http://web.archive.org/web/20050403205914/http://tildegrugal.net/tech/arp.php>. pp. 1-4.

Franco Travostino, Paul Daspit, Leon Gommans, Chetan Jog, Cees de Laat, Joe Mambretti, Inder Monga, Bas van Oudenaarde, Satish Raghunath, Phil Wang, "Seamless Live Migration of Virtual Machines over the MAN/WAN", Future Generation Computer Systems—IGrid 2005: The global lambda integrated facility, vol. 22 Issues 8, pp. 901-907, Oct. 2006.

Ganguly, A.; Agrawal, A.; Boykin, P.O.; Figueiredo, R., "WOW: Self-Organizing Wide Area Orerlay Networks of Virtual Workstations," High Performance Distributed Computing, 2006 15th IEEE International Symposium on, vol., no., pp. 30,42, 0-0 0 doi: 10.1109/HPDC.2006.1652133.

Christopher Clark, Keir Fraser, Steven Hand, Jacob Gorm Hansen, Eric Jul, Christian Limpach, Ian Pratt, Andrew Warfield, titled "Live Migration of Virtual Machines", presented at NSDI 2005: 2nd Symposium on Networked Systems Design & Implementation, vol. 2, in the Proceedings, sponsored by USENIX Association, May 2005 see pp. 273-286.

(56) References Cited

OTHER PUBLICATIONS

Petrone, M.; Zarrelli, R., "Enabling PVM to build parallel multidomain virtual machines," Parallel, Distributed, and Network-Based Processing, 2006. 14th Euromicro International Conference on, vol., no., pp. 8 pp.,, Feb. 15-17, 2006 doi: 10.1109/PDP.2006.33.

Information Disclosure Statement (IDS) Letter Regarding Common Patent Application(s), dated Jul. 15, 2013.

Information Disclosure Statement (IDS) Letter Regarding Common Patent Application(s), dated Mar. 1, 2012.

Ford, Bryan, Srisuresh, Pyda, and Kegel, Dan, "Peer-To-Peer Communication Across Network Address Translators", Feb. 17, 2005, 13 pages. http://www.brynosaurus.com/pub/net/p2pnat/ accessed Jan. 13, 2012.

* cited by examiner

IP JAMMING SYSTEMS UTILIZING VIRTUAL DISPERSIVE NETWORKING

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to networking in military applications.

A need exists for improvement in networking technologies in military applications. This, and other needs, are addressed by one or more aspects of the present invention.

SUMMARY OF THE INVENTION

The present invention includes many aspects and features. Moreover, while many aspects and features relate to, and are described in, a military context, the present invention is not limited to use only in a military context, as will become apparent from the following summaries and detailed descriptions of aspects, features, and one or more embodiments of the present invention.

Accordingly, one aspect of the present invention relates to a cyber warfare engine.

Another aspect of the present invention relates to an unmanned aerial system platform.

Another aspect of the present invention relates to a method for an unmanned aerial system platform.

Another aspect of the present invention relates to an unmanned aerial vehicle including electronic components configured for virtual dispersive routing.

Another aspect of the present invention relates to an IP jammer.

Another aspect of the present invention relates to a method of IP jamming as disclosed.

Another aspect of the present invention relates to an unmanned aerial system. The unmanned aerial system includes a plurality of unmanned aerial vehicles, each unmanned aerial vehicle comprising, or having secured thereto, electronic components having software loaded thereon configured to spawn a virtual machine that virtualizes network capabilities of the electronic components; and an electronic device having software loaded thereon configured to spawn a virtual machine that virtualizes network capabilities of the respective electronic device. Each of the plurality of unmanned aerial vehicles is configured for air-to-air electronic communications over a connection with other of the unmanned aerial vehicles, the connection being associated with a virtual machine spawned at the electronic components associated with that respective unmanned aerial vehicle that virtualizes network capabilities of the electronic components. Further, each of the plurality of unmanned aerial vehicles is configured for air-to-ground communications over a connection with the electronic device, the connection being associated with a virtual machine spawned at the electronic components associated with that respective unmanned aerial vehicle that virtualizes network capabilities of the electronic components.

Another aspect of the present invention relates to a method for IP jamming utilizing a plurality of electronic devices each having software loaded thereon configured to spawn a virtual machine that virtualizes network capabilities of that respective electronic device. The method includes communicating from a first electronic device, utilizing virtual dispersive routing, networking information for a network attack to a plurality of other electronic devices; commencing, by the plurality of other electronic devices, a network attack using received networking information; communicating, to each of the plurality of other electronic devices, instructions to modify the network attack; and adapting, in response to received instructions to modify the network attack, by one or more of the plurality of other electronic devices, operations forming part of the commenced network attack.

Another aspect of the present invention relates to a method for a cyber warfare engine.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

Furthermore, the invention disclosed in the present application does not include, and hereby affirmatively excludes by definition, any invention that is the subject of International Patent Application No. PCT/US2008/080397. This definition of the invention disclosed in the present application is limited to the present application and does not apply to any other application. Moreover, the disclosure of International Patent Application No. PCT/US2008/080397 is incorporated by reference herein to the extent, if any, necessary to comply with requirements of 35 U.S.C. 112, such as the enablement requirement.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
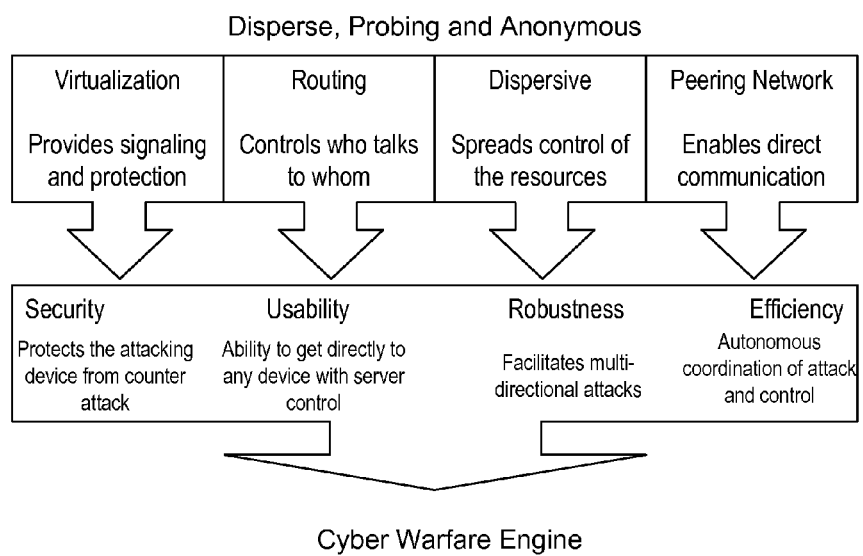
FIG. 1 illustrates advantages of a cyber warfare engine utilizing virtual dispersive routing in combination with a peer to peer network.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

At least some preferred embodiments of the invention utilize virtual dispersive networking, including virtual dispersive routing and virtual dispersive communications, as disclosed in Twitchell U.S. patent application Ser. No. 12/499,075, titled MULTIPLEXED CLIENT SERVER (MCS) COMMUNICATIONS AND SYSTEMS", and filed Jul. 7, 2009, and in Twitchell U.S. patent application Ser. No. 13/007,595, titled "APPARATUS, SYSTEMS AND METHODS UTILIZING DISPERSIVE NETWORKING", and filed Jan. 14, 2011, which patent applications, any patent application publications thereof, including USPA Pub. No. 2010/0009758, and any patents issuing therefrom, are hereby incorporated herein by reference.

Cyber Warfare Implementations

In one or more preferred implementations, virtual dispersive routing is utilized to provide offensive and defensive functions in a cyber warfare context.

From an offensive perspective, virtual dispersive routing enables a client to conceal the origin of an attack, provide a geometric ramp-up of an attack, inflict DoS (Denial of Service) or DDoS (Distributed Denial of Service) attacks, breach firewalls, and conduct other offensive measures.

From a defensive perspective, virtual dispersive routing enables clients to communicate directly to other clients over an IP network regardless of whether they are behind NATs and firewalls. As described hereinabove, virtual dispersive routing enables single key encryption from client to client at the virtual machine layer, control over QoS by enabling independent routing possibilities, the ability to support multiple communication interfaces such as WiFi, mobile, and Ethernet simultaneously, dynamic hand-off capabilities, and secure and private communications.

Figure 2:
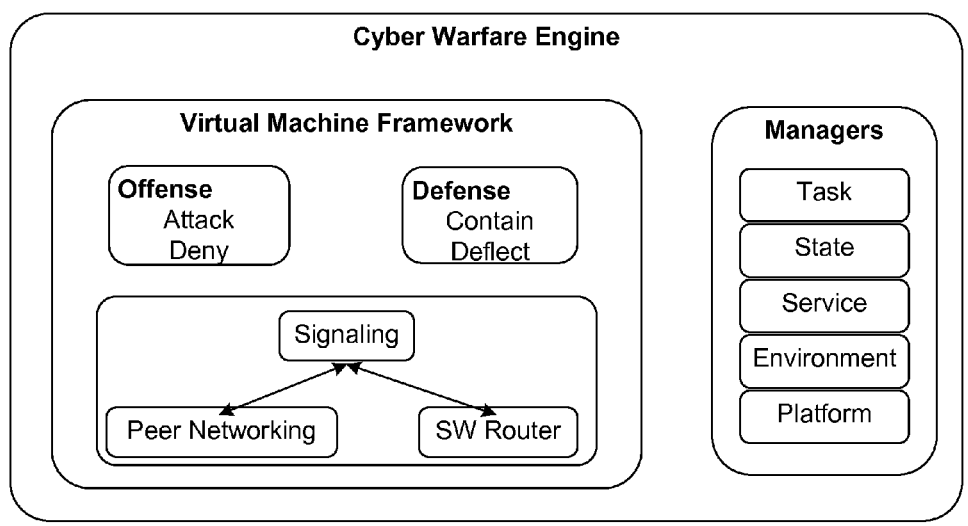
FIG. 2 illustrates components of an exemplary cyber warfare engine.

In one or more preferred implementations, virtual dispersive routing is utilized in a cyber warfare engine that provides basic functions needed to protect, deny, deflect or attack. The engine is preferably managed at various levels to provide distributed control. FIG. 1 illustrates advantages of a cyber warfare engine utilizing virtual dispersive routing in combination with a peer to peer network, and FIG. 2 illustrates components of an exemplary cyber warfare engine.

Exemplary implementations of virtual dispersive routing in a cyber warfare context will now be described.

IP Jamming

IP based communication systems are subject to various network attacks. Due to their special advantages and positioning in the IP network stack, virtual machines are able to quickly coordinate and leverage resources, e.g. clients, on a network to handle extremely large-scale peer-to-peer targeted network attacks. These resources can be used to deny a mobile device, such as, for example, a mobile phone or other device utilizing WCDMA, CDMA2000, UMTS, GSM EDGE, iBurst, WLL and other IP based communication systems, access to particular services, detect IP streaming events, and flood a particular device located in a known geographic area. In preferred implementations, the tactical effect is analogous to the creation of a distributed IP based jammer.

In one or more preferred implementations, virtual dispersive routing is utilized for IP jamming, such as, for example, in an IP jammer that can be used to attack servers and mobile devices. For example, as next generation mobile phone networks and other IP based communication systems commonly rely on IP connections to base stations and servers to pass voice and data traffic around the world, an IP jammer can be utilized to frustrate the use of such next generation mobile phones as IED triggers. In preferred implementations, an IP attack is utilized to create uncertainty in how trigger information can be conveyed to a target mobile device. If uncertainty is injected into the process, a mobile phone, or other IP based communication device, will become less attractive as an IED trigger. Further, leveraging location capabilities in a mobile phone or other IP based communication device can make such network attacks much more effective.

Figure 3:
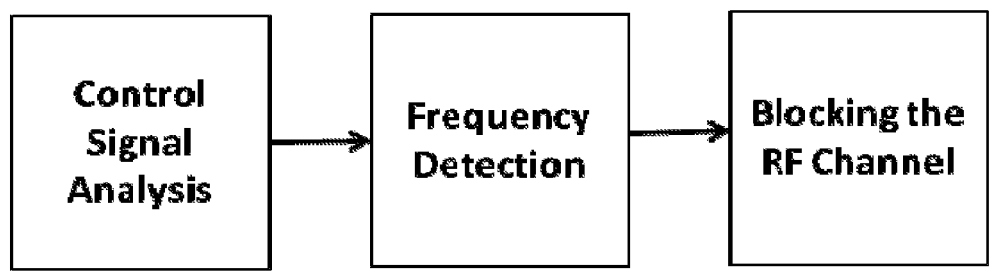
FIG. 3 illustrates basic processes utilized in conventional RF jamming.
Figure 4:
FIG. 4 illustrates processes utilized in one or more IP jamming implementations.

Conventionally, jamming techniques for mobile phones, to prevent their use as IED triggers, have focused on mobile phones' RF links. When selectively jamming an RF signal, the basic processes needed to accomplish such RF jamming include signal analysis, frequency detection, and transmission, where the RF channel is blocked, as illustrated in FIG. 3. However, increased data rates along with advanced antenna and radio technology can make it difficult to block a trigger event from being sent from a next generation mobile phone to a mobile wireless device. In one or more preferred implementations, processes analogous to an RF jammer are utilized for an IP jammer, as illustrated in FIG. 4.

A conventional RF jammer frequently first analyzes the spectrum to determine where a threat resides. Next, a frequency detection phase, as illustrated in FIG. 3, can be utilized to identify when a signal is being transmitted.

Analogous to the RF context, in one or more IP jammer implementations, IP addresses and ports are preferably monitored and mapped so that, if an attack is commenced, attacking packets can be directed to the appropriate IP addresses and ports. In order to effect IP jamming, a target connection needs to be identified and located, and resources ramped up to carry out an attack.

Returning to the RF context, when blocking an RF channel, an RF jammer engages a target modem broadcast, and denies communications of the jammed radio. In the IP context, in an adaptation phase, IP jamming can be utilized to engage a target connection at source and destination IP addresses and ports.

In TCP/IP networks, communication commonly occurs primarily between servers and clients. In effecting IP jamming, if a target device is connected to a server, an attack on the server can be utilized to slow server response times, such as, for example, a Distributed Denial of Service (DDoS) attack. Additionally, or alternatively, the device itself can be attacked, for example by utilizing a UDP flood attack.

Thus, in one or more preferred implementations, an IP jammer utilizing virtual dispersive routing focuses on three basic functions: mapping, coordination, and adaptation. The mapping function gathers information needed to attack one or more target devices; the coordination function sets up necessary resources to start an attack; and the adaptation function measures success parameters and adapts an attack to maintain effectiveness. Each of these functions will now be described in more detail with regard to one or more exemplary implementations.

IP Jamming—Mapping

With respect to mapping functionality, mapping devices on the Internet can be a tedious and resource intensive task. Preferably, servers are utilized to monitor traffic and analyze data to gain access to IP addresses, port information, and connection timing.

In a preferred mapping process for an IP jammer focusing on communications within a country, as a first step, one or more ranges of IP addresses assigned to a particular country or carrier are determined. These ranges of IP addresses are then targeted for monitoring. Monitoring the activity of devices within these ranges of IP addresses enables a server network to determine network topology and the IP addresses of mobile devices and ports used. If a mobile device is utilizing a WiFi access point, network information needed for attacking such WiFi network is preferably also gathered. Preferably, the monitoring of traffic on a network is carried out by servers that have permanent presence on the network.

Some third and fourth generation mobile phones include global location capability built into them. Servers that are available to mobile devices can be cataloged and monitored for traffic. If a server utilizes location information, packet formation can be deciphered, and such location information can be ascertained and utilized, for example to more precisely target potential IED devices.

IP Jamming—Coordination

With respect to coordination functionality, once the decision has been made to disrupt a network, such as, for example, a mobile phone network, communications are initiated to clients utilizing virtual dispersive routing. Preferably, the virtual machines of such clients are seeded with IP addresses and port information corresponding to one or more devices or application servers supporting the devices.

Figure 5:
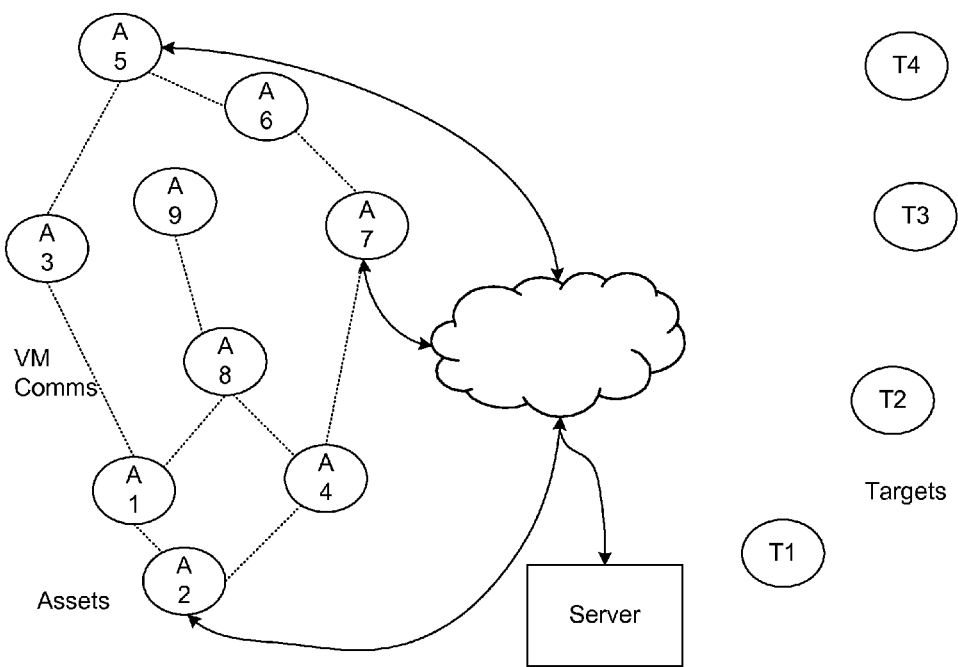
FIG. 5 illustrates an exemplary client network in which a server communicates IP addresses and port information for an attack to clients.

FIG. 5 illustrates an exemplary client network in which a server communicates IP addresses and port information for an attack to clients. Alternatively, a client, for example a client functioning as a multiplexed client server, could begin the process of communicating IP addresses and port information for an attack. Clients who receive such information, whether from a conventional server or from another client, can thereafter communicate with other clients in their contact lists to help build the number of clients for an attack. Because such communications can occur between virtual machines at layer two, such communications can be very rapid and covert. Preferably, preparation for, and eventual participation in, a virtual machine controlled attack does not interfere with existing messaging on an attacking client, instead, the activity is preferably completed in the background minimizing the measurable impact on the attacking device and maintaining the stealth of the attack.

In at least some preferred implementations, the coordination of an attack is controlled and monitored by a server, as illustrated in FIG. 5, although the server does not have to be a fixed device. In some preferred implementations, a client functioning as a multiplexed client server can function to control and monitor an attack. Generally, multiplexed client server roles can be assigned as required.

Figure 6:
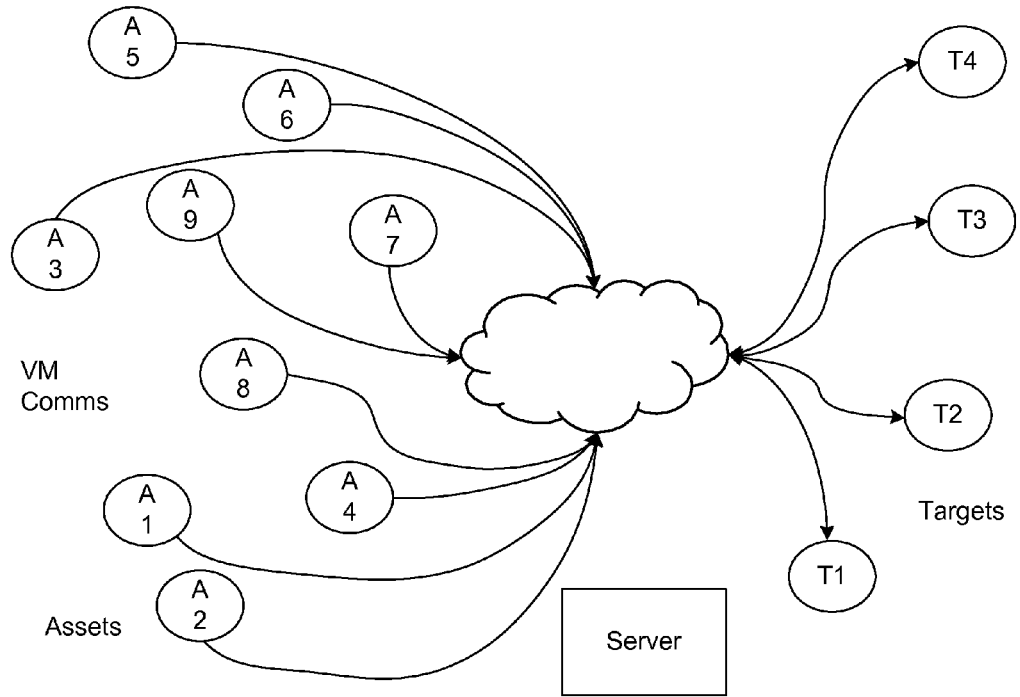
FIG. 6 illustrates an ongoing network attack following such seeding of the clients of FIG. 5 with information regarding targets.

Once clients have been seeded with IP addresses and port information for an attack, the attack can be commenced. FIG. 6 illustrates an ongoing attack following such seeding of the clients of FIG. 5 with information regarding targets.

In one or more preferred implementations, utilized attacks may include, inter alia, Denial of Service and Distributed Denial of service attacks, SYN floods, UDP floods, ICMP Floods, Land Attacks, and Teardrop attacks. A SYN attack utilizes clients that continually send SYNs to a server, receive a SYN/ACK from the server, but then never acknowledge the receipt of the SYN/ACK. The continual sending of SYNs ties up resources on the server, thus making it impossible for the server to respond to accept legitimate connection requests. In a UDP flood, UDP datagrams are continually sent to clients and servers making it very difficult to receive valid network requests. In a ICMP Flood, attackers continually send ICMP echo requests and never acknowledge an echo reply forcing the server to respond to TCP/IP network timeouts. A Land Attack initiates a SYN Flood attack using the IP address of the victim on the source and destination IP address. This attack eventually forces a victim device to connect with it; pushing it into a "dead loop" until the idle timeout value is reached. A Teardrop Attack focuses on the fragmentation and reassembly of IP packets. Attackers transmits fragmented IP address packets containing overlapped Fragment Offsets making a victim device unable to reassemble them, thereby exhausting the victim device's resources and possibly crashing it.

In one or more preferred implementations, for an attack focusing on one or more servers, DDoS attacks are utilized where each client sends repeated requests to the one or more servers for information, thereby flooding the one or more servers' queues. In one or more preferred implementations, for an attack focusing on mobile devices, such as for example mobile phone devices, UDP packet floods are utilized, particularly if the devices are behind NATs or firewalls.

Figure 8:
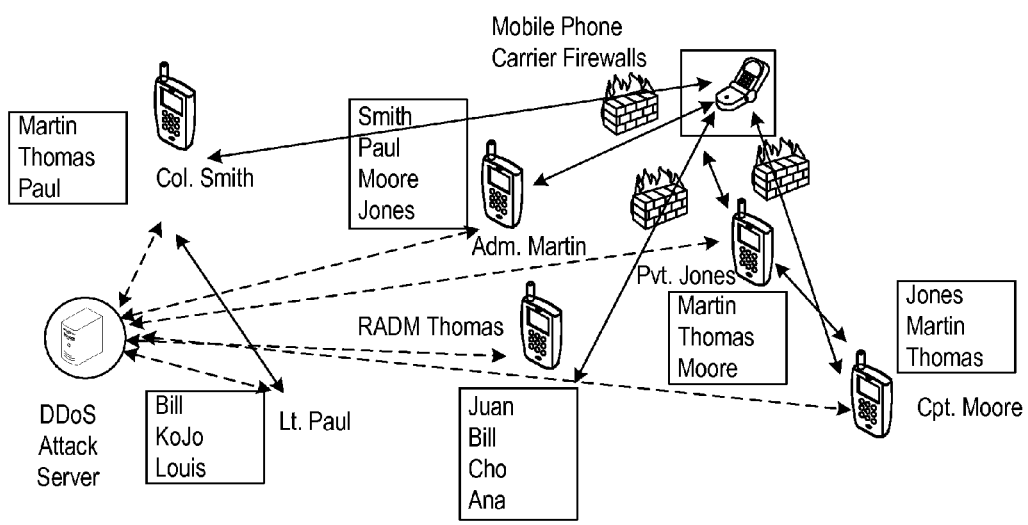
FIG. 8 illustrates a network of clients utilizing virtual dispersive routing that are utilized to frustrate use of a mobile device as an IED trigger.

When using more conventional methodologies, network anomalies can prevent rapid communication and fast ramp-up of attacks. In at least some preferred implementations, the use of virtual dispersive routing technology, as described herein, provides the ability to circumvent firewalls, broadband routers, NATs, and to counter DDoS. FIG. 8 illustrates a network of clients utilizing virtual dispersive routing that are utilized to frustrate use of a mobile device as an IED trigger. Each client has a contact list and knows how to communicate with the other clients on its contact list, and a DDoS attack server coordinates an attack on a mobile phone to frustrate its use as an IED trigger.

It will be appreciated that the detailing of network attacks herein is exemplary rather than exhaustive, and other network attacks may well be utilized in one or more preferred implementations. Further, the number of devices that a base station can connect to is limited, and each system has a Call Access Control (CAC) mechanism that is exploited in one or more implementations.

IP Jamming—Adaptation

With respect to adaptation functionality, as there is a constant evolution in the attack and defense of networks, it is critical to have a flexible system that can adapt to changing requirements quickly. In one or more preferred implementations, once an attack is initiated and is being carried out, metrics are gathered on the effectiveness of the attack. Preferably, information is gathered from attacking client devices such as, for example, a ramp-up time, response timing from targeted devices, a number of packets sent, and a number of attacking devices. The metrics are preferably used to "tune" the attack to ensure effectiveness.

Figure 7:
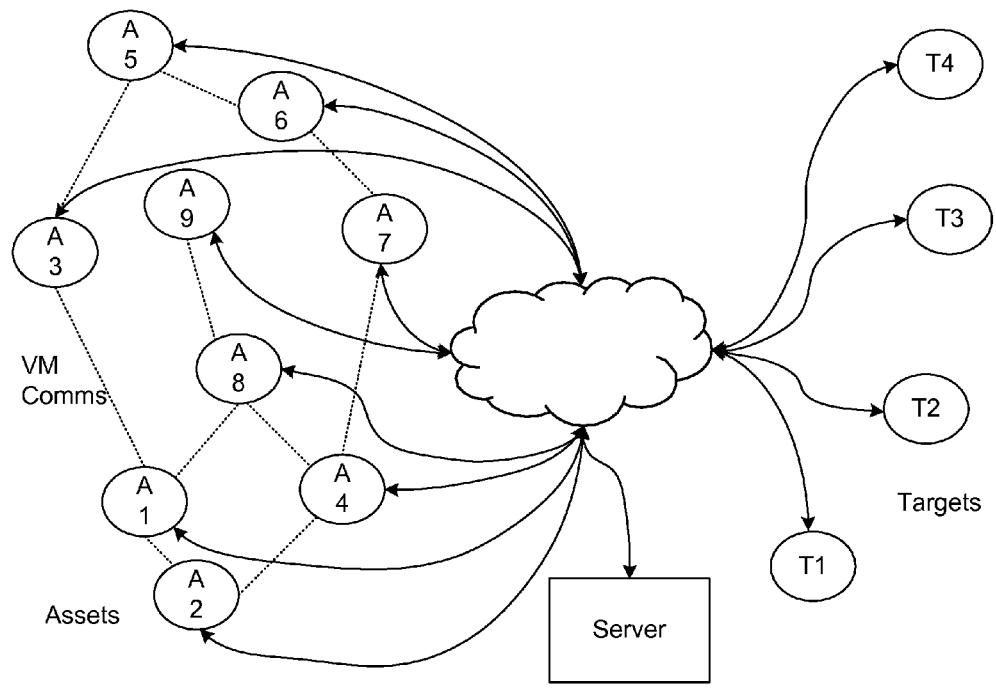
FIG. 7 illustrates how a server is able to communicate with clients while a network attack is ongoing to modify or change the attack to improve performance.

As many organizations use filtering on firewalls and routers to block packets from fixed sources, constantly changing source addresses are preferably utilized. Further, because there exist techniques, such as packet-filtering techniques and other sophisticated DDoS defeat software, that can significantly degrade an attack, in preferred implementations an attack is capable of being modified "on the fly" to deny communication to a target, e.g. a target mobile device. FIG. 7 illustrates how a server is able to communicate with clients while an attack is ongoing to modify or change the attack to improve performance.

In some preferred implementations, as described hereinabove, the use of a virtual machine wedged between hardware and an operating system enables fast communications via layer two messaging which provides a method for such modifications. This speed is critical, for example, in changing a network attack from a SYN Flood to a Teardrop attack. Additionally, or alternatively, a server or controlling client could also initiate a separate attack with the same set of clients or use another set of clients altogether.

IP Jamming—Exemplary Architecture

Figure 9:
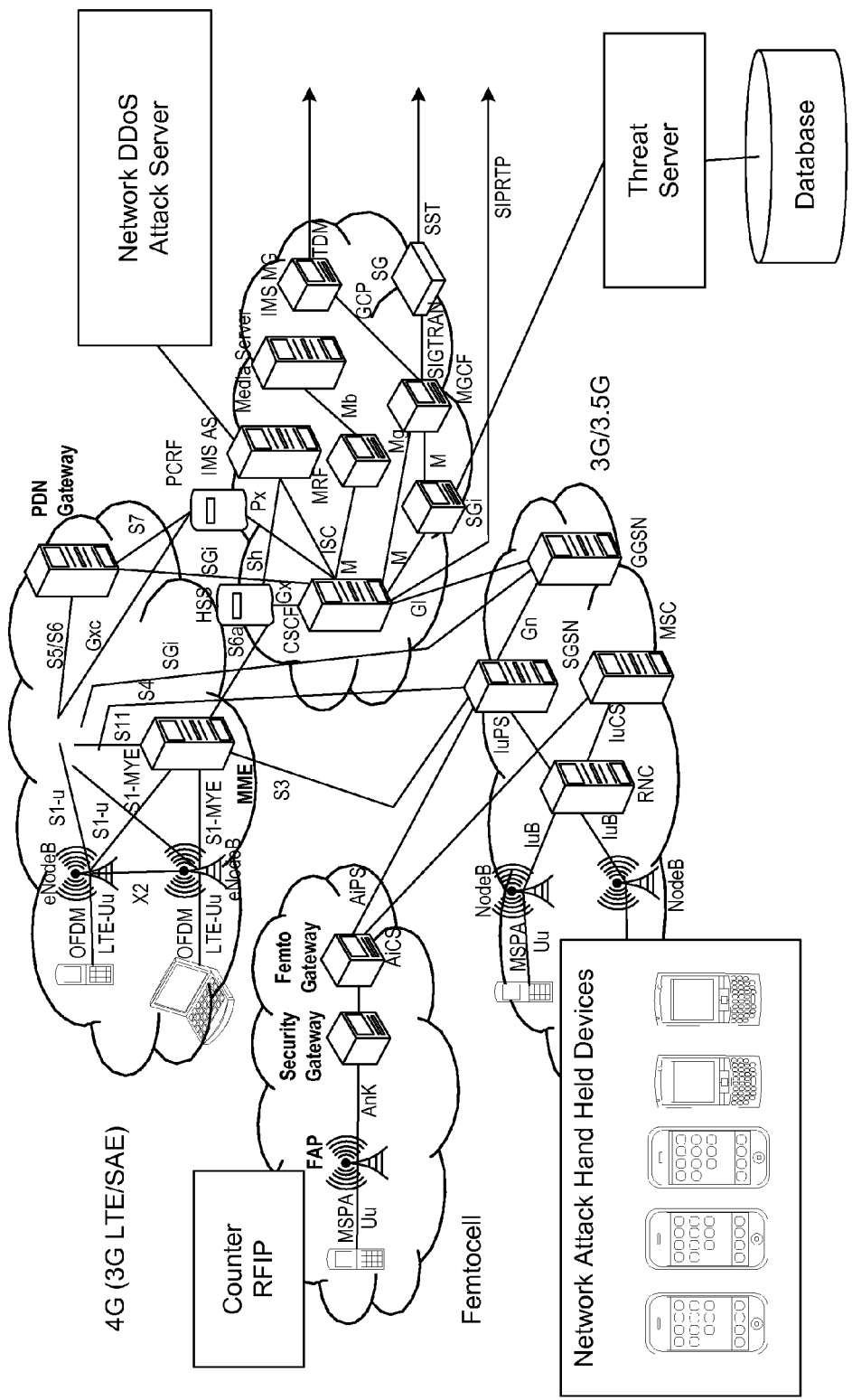
FIG. 9 illustrates exemplary architecture for an IP jamming implementation.

In a preferred implementation, an IP jammer implementation includes a phone application for client-side jamming to defeat DDoS defeat network software, network DDoS attack server software, threat server and database software, and counter RFIP for RF side DoS attacks. FIG. 9 illustrates exemplary architecture for an IP jamming implementation.

Unmanned Aerial Systems

Unmanned aerial vehicles (UAVs) are increasingly seen as being advantageous for use in future military action. Conventionally, unmanned aerial system (UAS) platforms for supporting the use of such UAVs often represent simple link communications between UAVs and ground stations.

In at least some preferred implementations, a more comprehensive solution is utilized to support reconnaissance, provide high-speed communications to troops on the ground and unattended ground sensors (UGS), continue operation in tough jamming environments, provide robust networking capabilities, and provide remote linking capabilities back to remote bases such as a forward operations base (FOB) or the Pentagon.

One potential concern with any UAS platform is jamming. One of the most difficult systems to jam is a mobile phone system such as a system utilizing IEEE 802.16 (WiMAX) or IEEE 802.20 (iBurst) that extensively uses smart antenna technology, MIMO (Multiple Input Multiple Output), sophisticated DSP (Digital Signal Processing) algorithms, extremely high data rates, and complex protocols. Such a system utilizes high powered transmission and provides the ability for mobile devices to transition between cells using soft-handoff, thereby provide a formidable radio network with high data rate capabilities and frequency diversity (i.e. 2.3 GHz, 2.4 GHz, 2.5 GHz, 3.5 GHz and 5.8 GHz). Such a network enables the use of mobile devices that support multiband and multi-mode, and provides a ready stream of chip level systems to leverage. A 4G mobile WiMAX platform, or a similar platform, can provide a majority of the physical layer support for a comprehensive UAS platform. Mobile WiMAX supports significant high-speed data traffic, supports varying frequencies to enable RF diversity and allow for the use of a large number of UAVs in the air simultaneously, provides seamless handoff for support of UAVs moving in and out of a battle space, communicates with varying off-the-shelf devices, can be modified easily to secure and provide unique signatures, and supports extremely large populations of users. The commercial availability of mobile WiMAX makes such a solution relatively low cost, however, it potentially opens a hacking opportunity for an enemy.

The security and efficiency of such a network are driven by the software controlling the network. In at least some implementations, virtual dispersive routing software uses virtual machine technology to provide a signaling capability combined with a routing capacity to secure and defend a network. In one or more preferred implementations, virtual dispersive routing software is utilized in a UAS platform that represents a comprehensive communication tool enabling high data rate networking between ground devices, UAV to UAV networking, and UAV to ground communications. In at least some preferred implementations, frequency allocation, provisioning, and RF stealth are addressed in combination with virtual dispersive routing to establish a UAS platform that is usable, difficult to hack, and resilient.

Although server-centric solutions can be vulnerable to hacking, the use of virtual dispersive routing can obviate some of this vulnerability. However, in a network utilizing virtual dispersive routing, if a main server of a network becomes too busy due to a network attack and denies connections since it is too busy to service requests, a node of the network could immediately communicate to a backup server to continue an application after it is unable to communicate with the main server. Another node could be instructed to communicate with an unlisted server after it is denied service from the main server. The provision of client side help during a DoS or DDoS attack strengthens the ability of a network to provide users with appropriate quality of service and responsiveness.

In one or more preferred implementations, use of virtual dispersive routing enables UAS networks that can function in contested and congested spectrum environments. Preferably, such a UAS network is able to handle varying loads and heavy audio and video traffic, is highly spread, and represents an anti-jamming RF networking system based on mobile WiMAX network components. In some preferred implementations, communications are secured using virtual machine signaling and end-to-end single key encryption. For example, as described hereinabove, using virtual dispersive routing technology, if a "hack" is suspected on a connection, the connection can be isolated and re-routed to a server that analyzes the hack in real-time. Since routing is virtualized at the client, the client can communicate to the other virtual machine it was communicating with that it is changing its IP address and re-establish another connection automatically.

Figure 10:
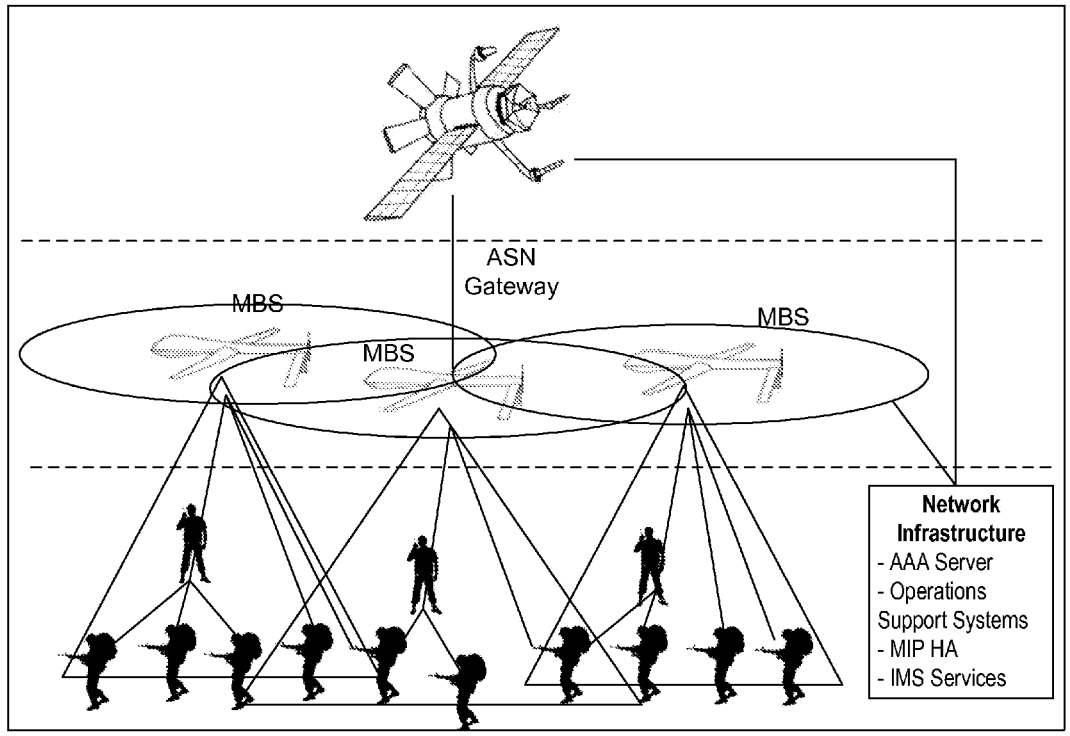
FIG. 10 illustrates exemplary architecture for a UAS platform.

In at least some preferred implementations, end devices are utilized that can automatically roam from one UAV to another UAV, thereby enabling dynamic communications in challenging environments. In some preferred implementations, mobile base stations are mounted on, or form part of, a UAV for ground communications, and/or for air-to-air communications, as illustrated in FIG. 10. Preferably, direct communications from one mobile device to another is supported without loading a backhaul link. Server and database control preferably allows for immediate dissemination. Preferably, RF links provide fast traversal and redundancy, while RF signaling is utilized to allow for power control and stealth sensor capabilities.

Figure 11:
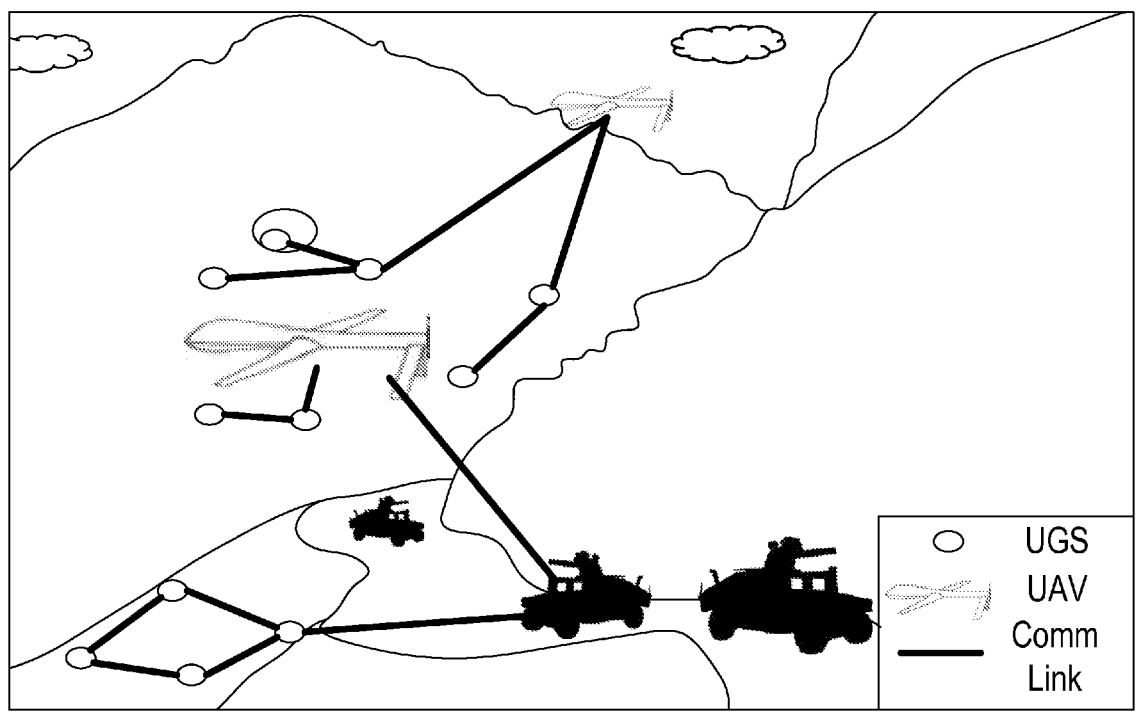
FIG. 11 illustrates the use of unattended ground sensors with a UAS platform.

It will be appreciated that, in some systems and methods, unattended ground sensors (UGSs) are utilized for intelligence gathering either alone or in combination with UAVs, as illustrated in FIG. 11. In at least some preferred implementations, a UAS system provides an RF interrupt to supported UGSs so that high speed network support can be provided without a significant drain on UGSs. In preferred implementations, this capability is believed to improve battery life from days to months. Preferably, the ability to control the power consumption state of communications hardware of a UGS can enable the UGS to queue data transfer to a UAV and provide an efficient transfer minimizing search requirements for a mobile radio of the UGS. For example, in some preferred implementations, RF communications from a UAV may wake-up a UGS, and the UGS will thereafter communicate data, e.g. sensor data, to the UAV. In at least some preferred implementations, wake-up technology, such as that disclosed in U.S. Pat. No. 7,539,520, which is hereby incorporated herein by reference, is utilized. Preferably, a UGS utilizes a very robust transceiver, such as a mobile WiMAX radio, given the ranges required to reach UAVs, and omni-directional antennas are preferably utilized to provide flexibility in placing the UGS. Preferably, UGSs are able to communicate data to other UGSs, which can then be communicated to a UAV, or another communication device, as illustrated in FIG. 11.

In one or more preferred implementations, a UAS platform includes devices configured to function as an IP jammer as described hereinabove.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for IP jamming utilizing a plurality of electronic devices each having software loaded thereon configured to spawn a virtual machine that virtualizes network capabilities of that respective electronic device, the method comprising:
    (a) spawning, at a first electronic device, a first virtual machine that virtualizes network capabilities of the first electronic device such that a first virtual network connection is provided;
    (b) spawning, at a first electronic device, a second virtual machine that virtualizes network capabilities of the first electronic device such that a second virtual network connection is provided;

(c) spawning, at a first electronic device, a third virtual machine that virtualizes network capabilities of the first electronic device such that a third virtual network connection is provided;

(d) spawning, at a second electronic device, a fourth virtual machine that virtualizes network capabilities of the second electronic device such that a fourth virtual network connection is provided;

(e) spawning, at a third electronic device, a fifth virtual machine that virtualizes network capabilities of the third electronic device such that a fifth virtual network connection is provided;

(f) spawning, at a fourth electronic device, a sixth virtual machine that virtualizes network capabilities of the fourth electronic device such that a sixth virtual network connection is provided;

(g) communicating, from the first electronic device utilizing the first virtual machine spawned at the first electronic device, networking information for a network attack to the second electronic device via the fourth virtual machine;

(h) communicating, from the first electronic device utilizing the second virtual machine spawned at the first electronic device, networking information for a network attack to the third electronic device via the fifth virtual machine;

(i) communicating, from the first electronic device utilizing the third virtual machine spawned at the first electronic device, networking information for a network attack to the fourth electronic device via the sixth virtual machine;

(j) spawning, at the second electronic device, a seventh virtual machine that virtualizes network capabilities of the second electronic device such that a seventh virtual network connection is provided;

(k) spawning, at the third electronic device, an eighth virtual machine that virtualizes network capabilities of the third electronic device such that an eighth virtual network connection is provided;

(l) spawning, at the fourth electronic device, a ninth virtual machine that virtualizes network capabilities of the fourth electronic device such that a ninth virtual network connection is provided;

(m) commencing, by the second electronic device utilizing the seventh virtual machine, a network attack using the networking information received via the fourth virtual machine by communicating packets over the seventh virtual network connection;

(n) commencing, by the third electronic device utilizing the eighth virtual machine, the network attack using the networking information received via the fifth virtual machine by communicating packets over the eighth virtual network connection;

(o) commencing, by the third electronic device utilizing the ninth virtual machine, the network attack using the networking information received via the sixth virtual machine by communicating packets over the ninth virtual network connection;

(p) communicating, from the first electronic device to the second electronic device via virtual network connections of the first and second electronic devices, instructions to modify the commenced network attack;

(q) communicating, from the first electronic device to the third electronic device via virtual network connections of the first and third electronic devices, instructions to modify the commenced network attack;

(r) communicating, from the first electronic device to the fourth electronic device via virtual network connections of the first and fourth electronic devices, instructions to modify the commenced network attack; and (s) adapting, by the second, third and fourth electronic devices in response to the received instructions to modify the network attack, operations forming part of the commenced network attack.

2. The method of claim 1, wherein the first electronic device comprises a server.

3. The method of claim 1, wherein the first electronic device comprises a mobile device.

4. The method of claim 1, wherein the second electronic device comprises a mobile device.

5. The method of claim 1, wherein the network information for a network attack communicated to the second electronic device comprises an IP address and port number.

6. The method of claim 1, wherein the network attack comprises a distributed denial of service attack.

7. The method of claim 1, wherein the network attack comprises a SYN flood.

8. The method of claim 1, wherein the network attack comprises a UDP flood.

9. The method of claim 1, wherein the network attack comprises an ICMP flood.

10. The method of claim 1, wherein the network attack comprises a land attack.

11. The method of claim 1, wherein the network attack comprises a teardrop attack.

12. A method for IP jamming utilizing a plurality of electronic devices each having software loaded thereon configured to spawn a virtual machine that virtualizes network capabilities of that respective electronic device, the method comprising:

(a) spawning, at a first electronic device, a first virtual machine that virtualizes network capabilities of the first electronic device such that a first virtual network connection is provided;

(b) spawning, at a first electronic device, a second virtual machine that virtualizes network capabilities of the first electronic device such that a second virtual network connection is provided;

(c) spawning, at a first electronic device, a third virtual machine that virtualizes network capabilities of the first electronic device such that a third virtual network connection is provided;

(d) spawning, at a second electronic device, a fourth virtual machine that virtualizes network capabilities of the second electronic device such that a fourth virtual network connection is provided;

(e) spawning, at a third electronic device, a fifth virtual machine that virtualizes network capabilities of the third electronic device such that a fifth virtual network connection is provided;

(f) spawning, at a fourth electronic device, a sixth virtual machine that virtualizes network capabilities of the fourth electronic device such that a sixth virtual network connection is provided;

(g) communicating, from the first electronic device utilizing the first virtual machine spawned at the first electronic device, networking information for a network attack to the second electronic device via the fourth virtual machine;

(h) communicating, from the first electronic device utilizing the second virtual machine spawned at the first electronic device, networking information for a network attack to the third electronic device via the fifth virtual machine;

(i) communicating, from the first electronic device utilizing the third virtual machine spawned at the first electronic device, networking information for a network attack to the fourth electronic device via the sixth virtual machine;

(j) spawning, at the second electronic device, a seventh virtual machine that virtualizes network capabilities of the second electronic device such that a seventh virtual network connection is provided;

(k) spawning, at the third electronic device, an eighth virtual machine that virtualizes network capabilities of the third electronic device such that an eighth virtual network connection is provided;

(l) spawning, at the fourth electronic device, a ninth virtual machine that virtualizes network capabilities of the fourth electronic device such that a ninth virtual network connection is provided;

(m) commencing, by the second electronic device utilizing the seventh virtual machine, a network attack using the networking information received via the fourth virtual machine by communicating packets over the seventh virtual network connection;

(n) commencing, by the third electronic device utilizing the eighth virtual machine, the network attack using the networking information received via the fifth virtual machine by communicating packets over the eighth virtual network connection; and (o) commencing, by the third electronic device utilizing the ninth virtual machine, the network attack using the networking information received via the sixth virtual machine by communicating packets over the ninth virtual network connection.

13. The method of claim 12, wherein the first electronic device comprises a server.

14. The method of claim 12, wherein the first electronic device comprises a mobile device.

15. The method of claim 12, wherein the second electronic device comprises a mobile device.

16. The method of claim 12, wherein the network information for a network attack communicated to the second electronic device comprises an IP address and port number.

17. A method for IP jamming utilizing a plurality of electronic devices each having software loaded thereon configured to spawn a virtual machine that virtualizes network capabilities of that respective electronic device, the method comprising:

(a) spawning, at a first electronic device, a plurality of virtual machines that each virtualizes network capabilities of the first electronic device such that a plurality of virtual network connections are provided;

(b) communicating, from the first electronic device utilizing the plurality of virtual machines spawned at the first electronic device, networking information for a network attack to a plurality of other electronic devices;

(c) spawning, at each respective electronic device of the plurality of other electronic devices, a respective set of one or more virtual machines that each virtualizes network capabilities of that respective electronic device such that a respective set of one or more virtual network connections are provided;

(d) commencing, by each of the plurality of other electronic devices utilizing the respective set of one or more virtual machines spawned at that respective electronic device, a network attack using received networking information by communicating packets over the respective set of one or more virtual network connections for that respective electronic device;

(c) communicating, from the first electronic device to each of the plurality of other electronic devices via one or more virtual network connections of the first electronic device, instructions to modify the network attack; and (d) adapting, in response to instructions to modify the network attack received at one or more of the plurality of other electronic devices via one or more virtual network connections of each of the one or more of the plurality of other electronic devices, by the one or more of the plurality of other electronic devices, operations forming part of the commenced network attack.

18. The method of claim 17, wherein the first electronic device comprises a server.

19. The method of claim 17, wherein the first electronic device comprises a mobile device.

20. The method of claim 12, wherein the communicated network information for a network attack comprises a plurality of IP addresses and port numbers.

* * * * *